United States Patent [19]
Kawajiri et al.

[11] Patent Number: 5,796,443
[45] Date of Patent: Aug. 18, 1998

[54] REAR PROJECTION TELEVISION UTILIZING TWO SEPARATE HOUSINGS FOR EASY TRANSPORTATION

[75] Inventors: Shinobu Kawajiri; Shinji Koubara; Kouhei Sunaga, all of Tokyo, Japan

[73] Assignee: Mitsubishi Denki Kabushiki Kaisha, Tokyo, Japan

[21] Appl. No.: 732,882

[22] Filed: Oct. 16, 1996

[30] Foreign Application Priority Data

Oct. 16, 1995  [JP]  Japan .................... 7-266560

[51] Int. Cl.⁶ .................................................. H04N 5/64
[52] U.S. Cl. ..................... 348/839; 348/836; 348/789
[58] Field of Search ............................. 348/744, 836, 348/838, 839, 843, 789, 787; H04N 5/64, 5/65, 5/74

[56] References Cited

U.S. PATENT DOCUMENTS

| | | | |
|---|---|---|---|
| 4,400,736 | 8/1983 | Weiss | 348/789 |
| 4,403,815 | 9/1983 | Runco | 312/7.2 |
| 5,315,395 | 5/1994 | Nakao | 348/789 |

FOREIGN PATENT DOCUMENTS

| | | | |
|---|---|---|---|
| 3821206 | 1/1989 | Germany | H04N 5/74 |
| 62-214785 | 9/1987 | Japan | H04N 5/74 |
| 3228482 | 10/1991 | Japan | H04N 5/74 |

*Primary Examiner*—Glenton B. Burgess

[57] ABSTRACT

A projection television includes a video projector for projecting a video image, electrical circuit for supplying a video signal to the video projector, and screen on which the video image projected from the video projector is formed. At least the screen is arranged in a first housing and at least the video projector is arranged in a second housing. The projection television is adapted to be disassembled either into two separate housings or into one overall assembly where a housing of a smaller volume of the two housings is completely accommodated within a housing of a larger volume. The second housing may be pivotally coupled to the first housing so that the second housing pivots out of the first housing to a first position to project the video image onto the screen when assembled for viewing, and into the first housing to a second position to be completely accommodated in the first housing.

11 Claims, 9 Drawing Sheets

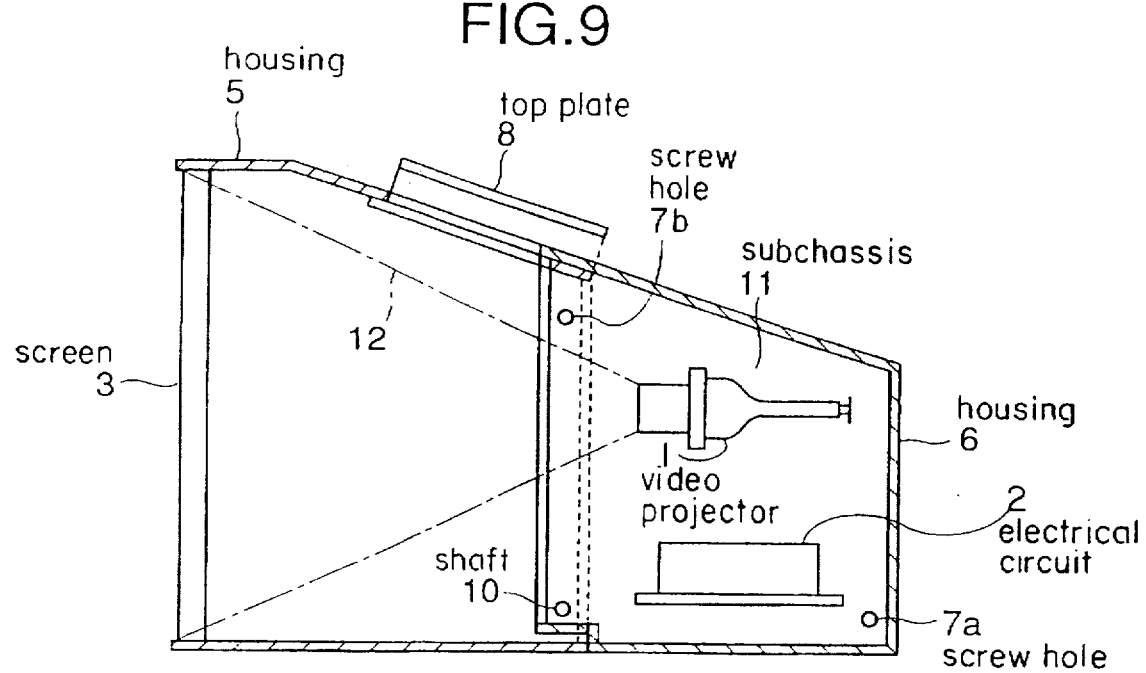
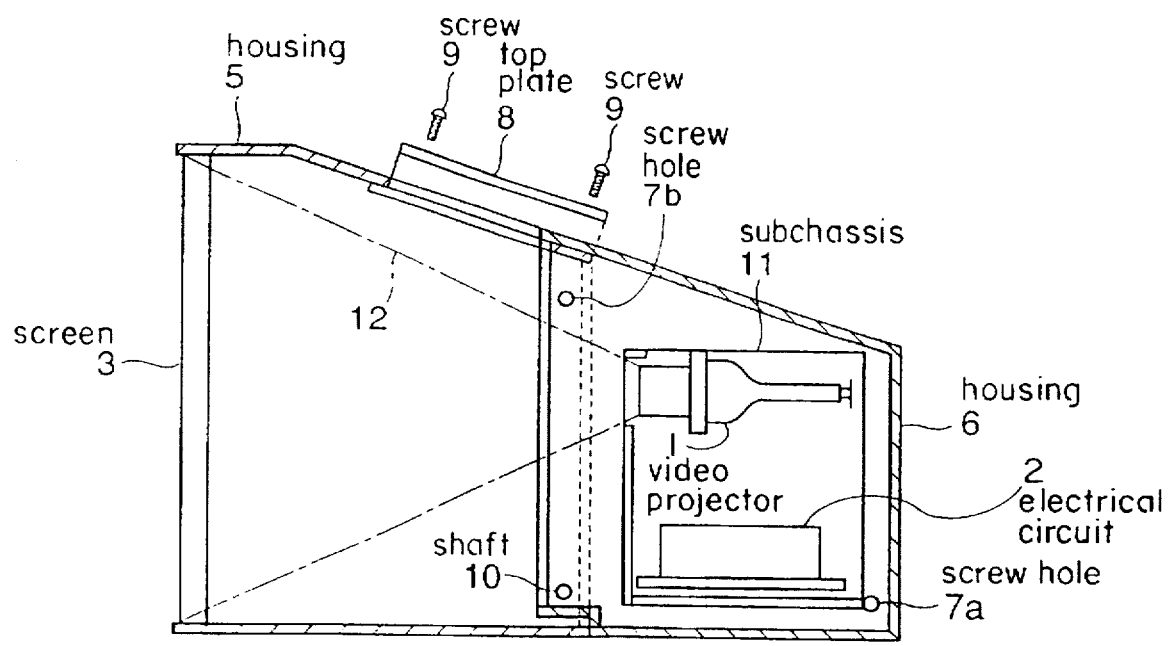

REAR PROJECTION TELEVISION UTILIZING TWO SEPARATE HOUSINGS FOR EASY TRANSPORTATION

BACKGROUND OF THE INVENTION

The present invention relates to a projection television where an image is projected from a video projecting apparatus onto a screen.

FIG. 11 is a perspective view of a prior art projection television. FIG. 12 is a cross-sectional side view of the prior art projection television shown in FIG. 11. Referring to FIG. 12, a video projector 1 receives a video signal from an electrical circuit 2 and projects the video signal onto a screen 3. A housing 4 houses the video projector 1, electrical circuit 2, and screen 3 therein.

With the aforementioned prior art projection television, the distance from the video projector 1 to the screen 3 increases with the size of the screen 3, resulting in a larger volume of the housing 4.

A large housing is bulky and is inconvenient to transport or store, leading to increased transportation and storage costs. In order to solve the drawback of the prior art device, Japanese Patent Preliminary Publication No. 3228482 discloses a projection television of two-piece construction where the entire apparatus is adapted to take the collapsed position (non-operative position) and the expanded position (operative position). However, the two parts cannot be separated from each other and therefore transportation is not easy.

SUMMARY OF THE INVENTION

The present invention was made in view of the aforementioned drawbacks.

An object of the invention is to provide a projection television which is easy to transport and inexpensive to transport and store.

Another object of the invention is to provide a projection television which can be easily and efficiently assembled.

Still another object of the invention is to provide a projection which has an attractive appearance.

Yet another object of the invention is to provide a projection television which is easily installed.

A projection television includes a video projector for projecting a video image, an electrical circuit for supplying a video signal to the video projector, and screen on which the video image projected from the video projector is formed. At least the screen is arranged in a first housing and at least the video projector is arranged in a second housing. The projection television is adapted to be disassembled either into two separate housings or into one overall assembly where a housing of a smaller volume of the first and second housings is completely received within a housing of a larger volume of the two housings. The second housing may be pivotally coupled to the first housing so that the second housing pivots to a first position to project the video image onto the screen when assembled for viewing, and to a second position to be completely accommodated in the first housing.

BRIEF DESCRIPTION OF THE DRAWINGS

FIG. 9 is a cross-sectional side view of a projection television according to the sixth embodiment.

FIG. 10 is a cross-sectional side view of a projection television according to a seventh embodiment of the invention.

DETAILED DESCRIPTION OF THE INVENTION

First Embodiment

Figure 1A:
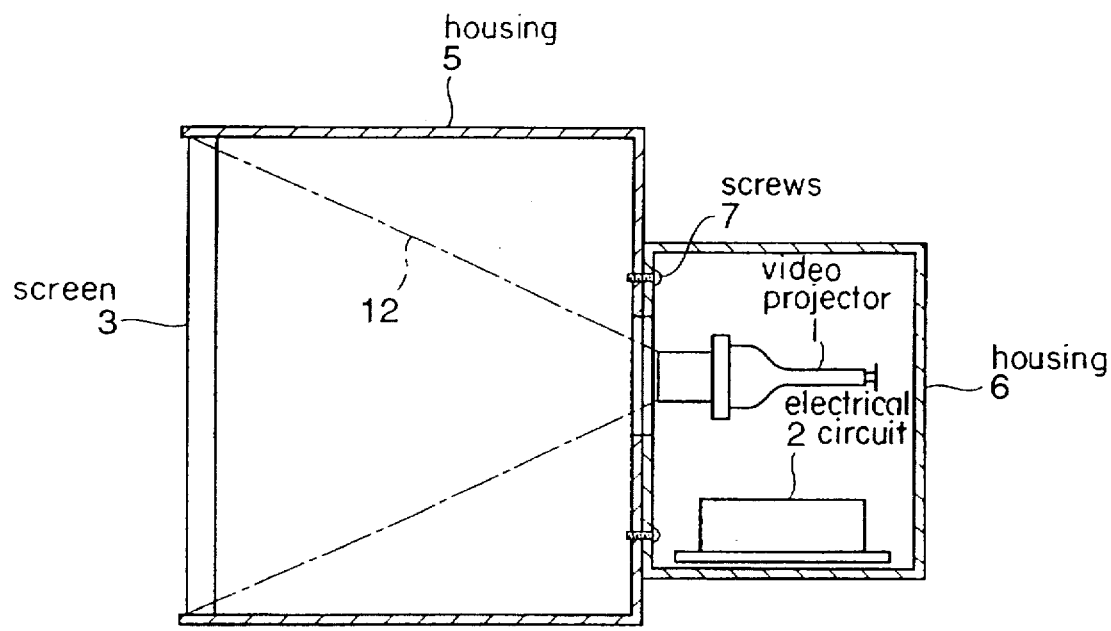
FIGS. 1A and 1B illustrate a projection television according to a first embodiment of the invention, FIG. 1A showing a partial cross-sectional side view and FIG. 1B showing a rear perspective view.
Figure 1B:
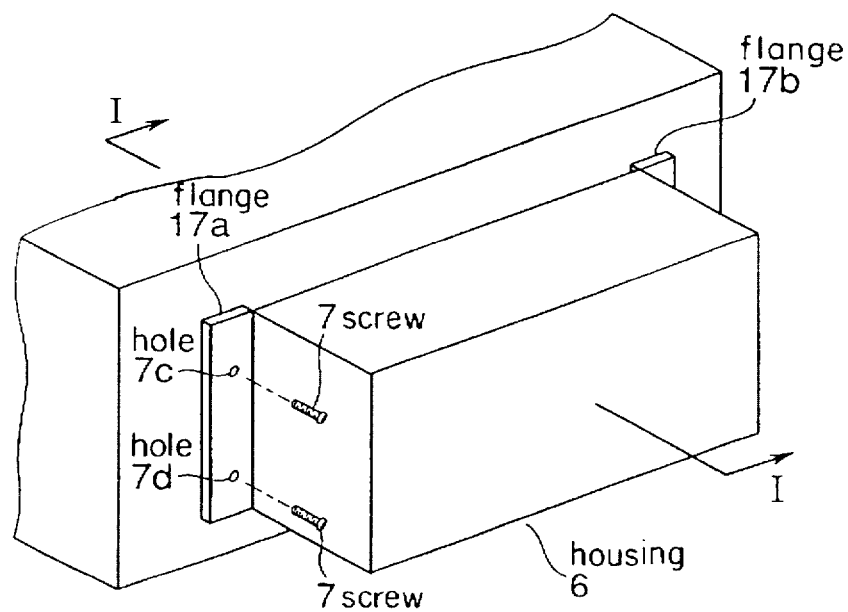

FIG. 1A is a partial cross-sectional side view, taken along lines I—I in FIG. 1B, of a projection television according to a first embodiment of the invention, and FIG. 1B illustrates a partial rear perspective view. Referring to FIG. 1A, a video projector 1 receives a video signal from an electrical circuit 2 and projects the video signal onto a screen 3. A housing 5 holds a screen 3 in position. A housing 6 holds a video projector 1 and an electrical circuit 2 in position therein. Screws 7 are inserted through holes 7c and 7d in flanges 17a and 17b to fixedly assemble the housing 5 and housing 6 together.

With the projection television of the aforementioned construction, dismounting the screws 7 from the housing 5 allows the housing 5 to be separated from the housing 6, the entire volume of the television being divided into two smaller volumes. Therefore, the respective housings 5 and 6 can be packed separately before transportation thereof. The construction makes the projection television less bulky, improving transportation efficiency.

Second Embodiment

Figure 2A:
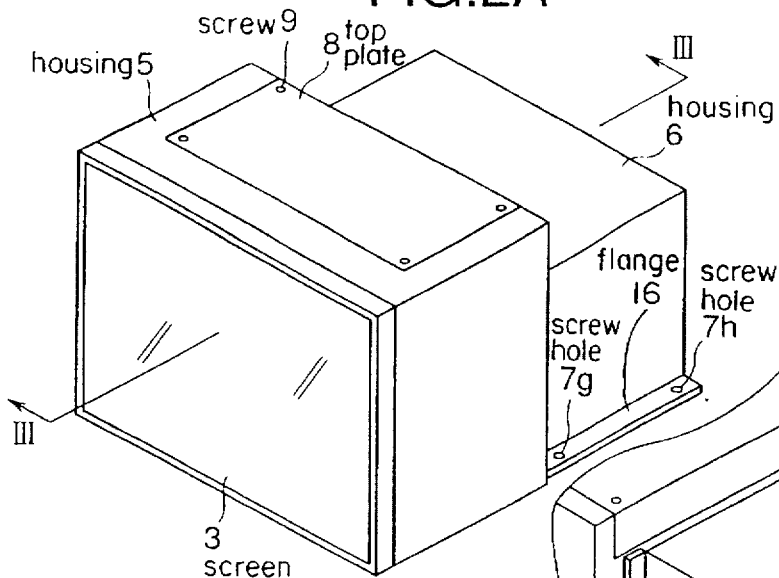
FIGS. 2A and 2B are perspective views of a projection television according to a second embodiment of the invention, FIG. 2A showing a front perspective view and FIG. 2B showing a partial rear perspective view.
Figure 2B:
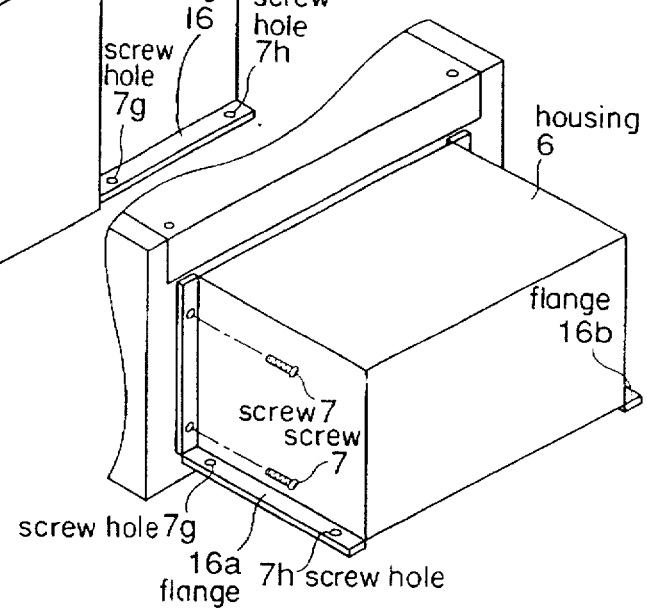
Figure 3:
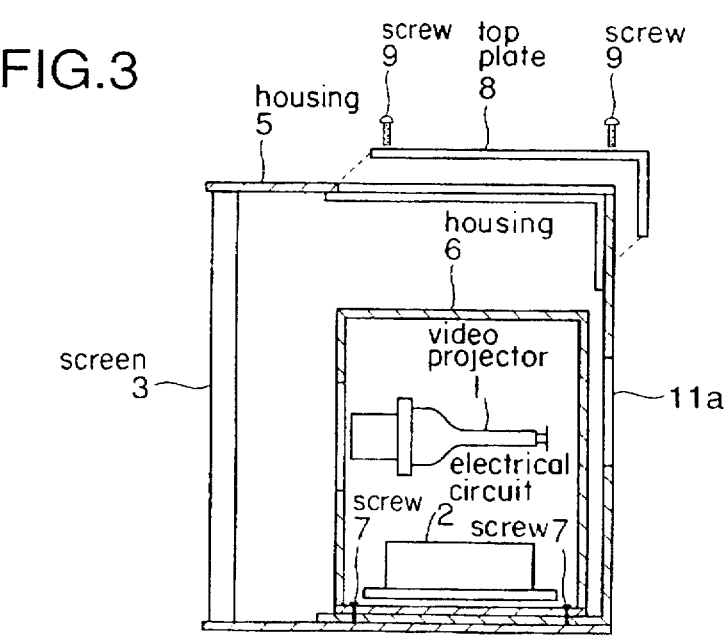
FIG. 3 is a cross-sectional side view of the projection television shown in FIG. 2, showing a housing 6 completely accommodated in a housing 5.

FIG. 2A is a front perspective view of a projection television according to a second embodiment of the invention and FIG. 2B is a partial rear perspective view. FIG. 3 is a cross-sectional side view of the projection television, taken along lines III—III in FIG. 2A, showing a housing 6 accommodated in a housing 5. Referring to FIGS. 2A, 2B and 3, structural elements 1–7 are similar to those shown in FIGS. 1A and 1B and description thereof has been omitted. A top plate 8 is detachably mounted to the housing 5 by means screws 9.

When disassembling the projection television for transportation, the screws 7 are unscrewed to separate the housing 5 from the housing 6, the entire volume of the television being divided into two smaller volumes. The top plate 8 is first removed from the housing 5 and the housing 6 is then inserted into the housing 5 from above to be placed in position. The screws 7 are inserted through holes 7g and 7h in flanges 16a and 16b and then tightened to securely assemble the housing 6 to the housing 5 as shown in FIG. 3.

Assembling the housing 6 into the housing 5 significantly decreases the overall volume of the projection television. This not only facilitates handling of the projection television during transportation but greatly reduces transportation and storage costs. In other words, the construction of the second embodiment is effective in reducing handling cost of the television after production.

Third Embodiment

Figure 4A:
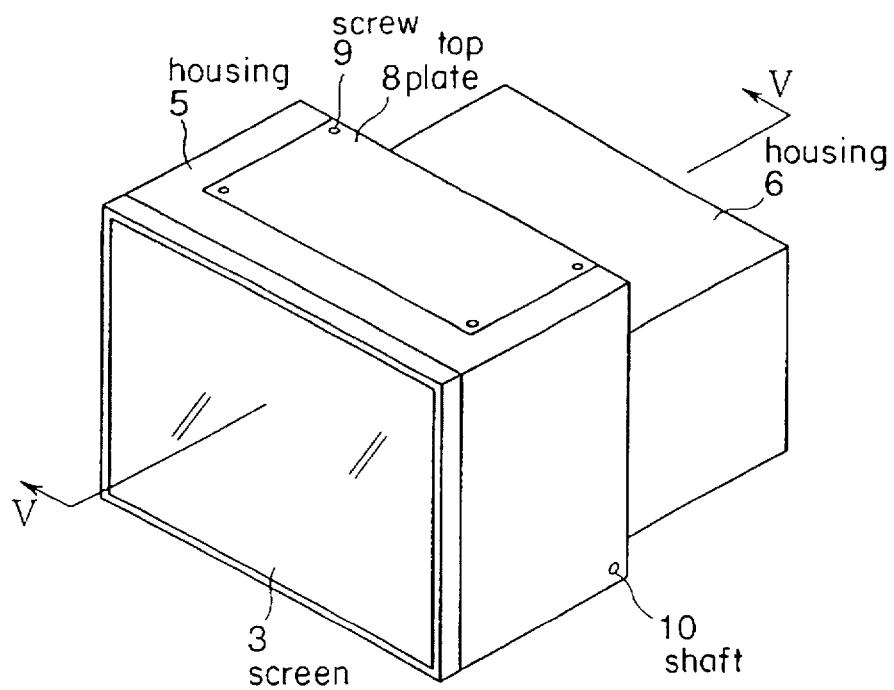
FIGS. 4A and 4B are perspective views of a projection television according to a third embodiment of the invention, FIG. 4A showing a front perspective view, and FIG. 4B showing a rear perspective view.
Figure 4B:
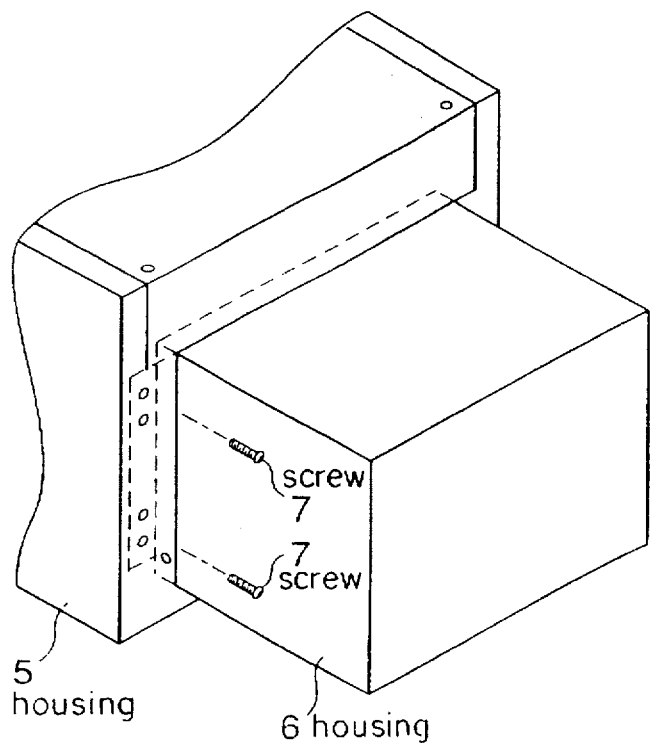
Figure 4C:
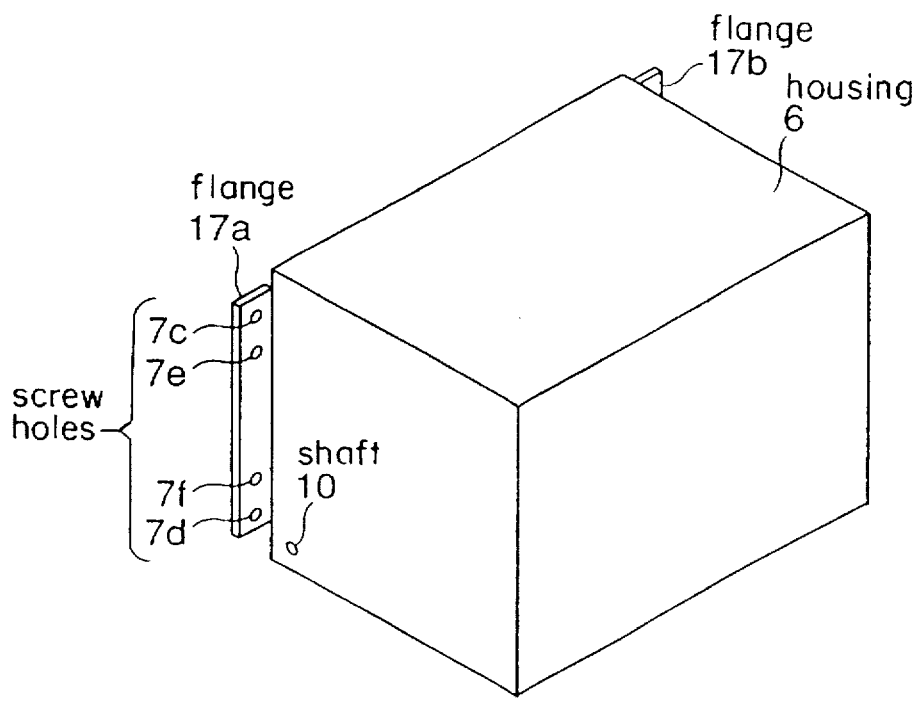
FIG. 4C is a rear perspective view of a housing 6 of the third embodiment.
Figure 5:
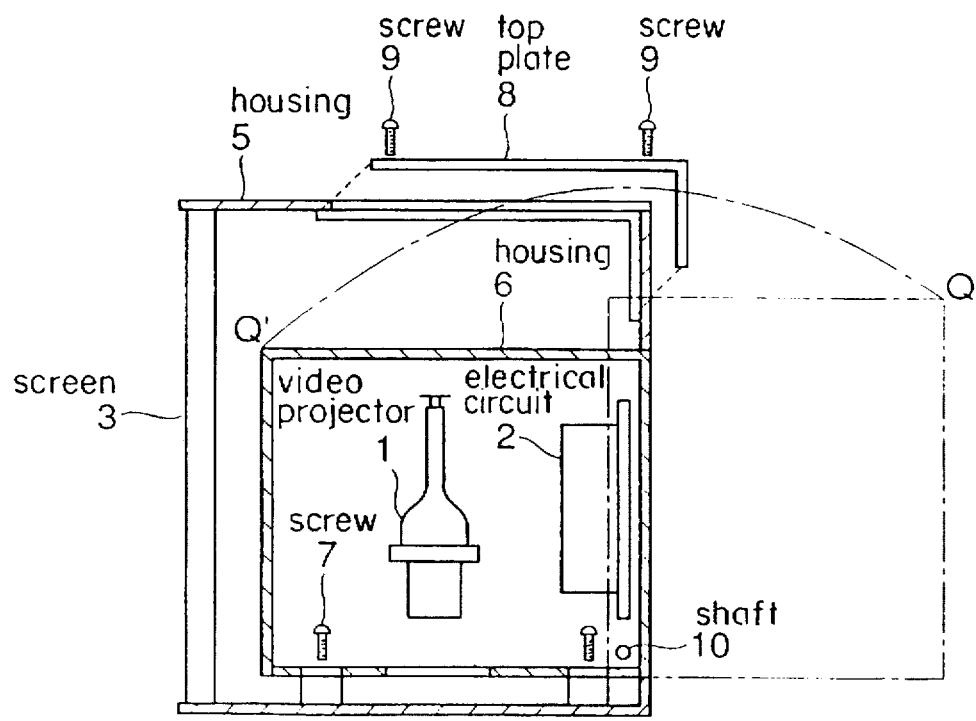
FIG. 5 is a cross-sectional side view of the projection television of the third embodiment, showing the housing 6 accommodated in a housing 5.

FIGS. 4A–4C are perspective views of a projection television according to a third embodiment of the invention. FIG. 4A being a front perspective view and FIG. 4B being a partial rear perspective view. FIG. 4C is a rear perspective view of a housing 6. FIG. 5 is a cross-sectional side view, taken along lines V—V in FIG. 4A, of the projection television showing a housing 6 accommodated in a housing 5. The structural elements 1–9 are similar to those shown in FIG. 3 and description thereof has been substantially omitted. The housing 6 is adapted to rotate about a shaft 10 into and out of the housing 5.

When transporting the projection television, a top plate 8 is first removed from the housing 5, the housing 6 is rotated into the housing 5 as shown in FIG. 5 and is secured to the housing 5 by screws 7 inserted through the mounting holes 7e and 7f in flanges 17a and 17b.Then, the top plate 8 is replaced on the housing 5.

When viewing, the top plate 8 is first removed from the housing 5, the housing 6 is rotated out of the housing 5 as shown in FIGS. 5 and 4B, and is firmly assembled to the housing 5 by screws 7 inserted through holes 7c and 7d with spacers, not shown, inserted between the housing 5 and the flanges 17a and 17b of the housing 6.

With the projection television of the aforementioned construction, dismounting screws 7 allows the housing 6 to rotate about the shaft 10 with respect to the housing 5. Moreover, dismounting the top plate 8 from the housing 5 allows the housing 5 to completely receive the housing 6 thereinto, significantly decreasing the overall volume of the apparatus to facilitate handling of the apparatus during transportation thereof. This not only greatly reduces transportation and storage costs of the television but also provides a prompt collapsing operation when collapsing the apparatus before transportation. This construction also improves assembly efficiency when expanding the projection television for viewing.

Fourth Embodiment

Figure 6A:
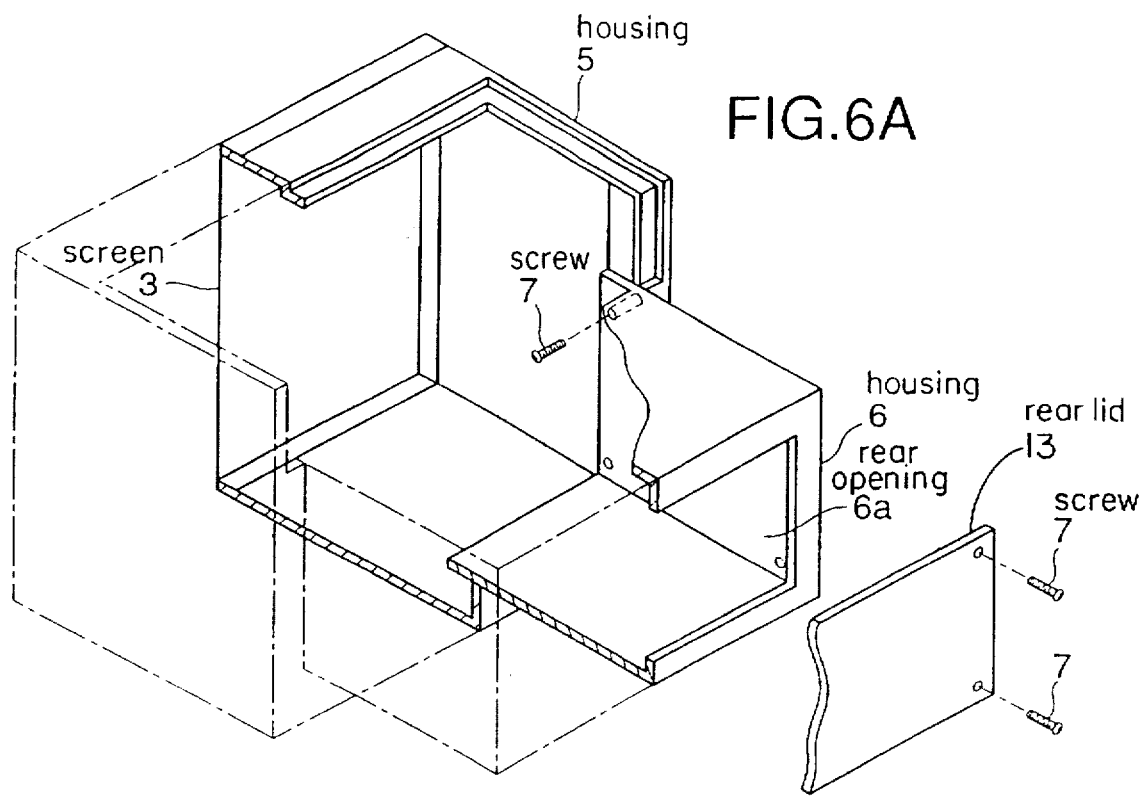
FIGS. 6A and 6B are fragmentary perspective views of a projection television according to a fourth embodiment of the invention.
Figure 6B:
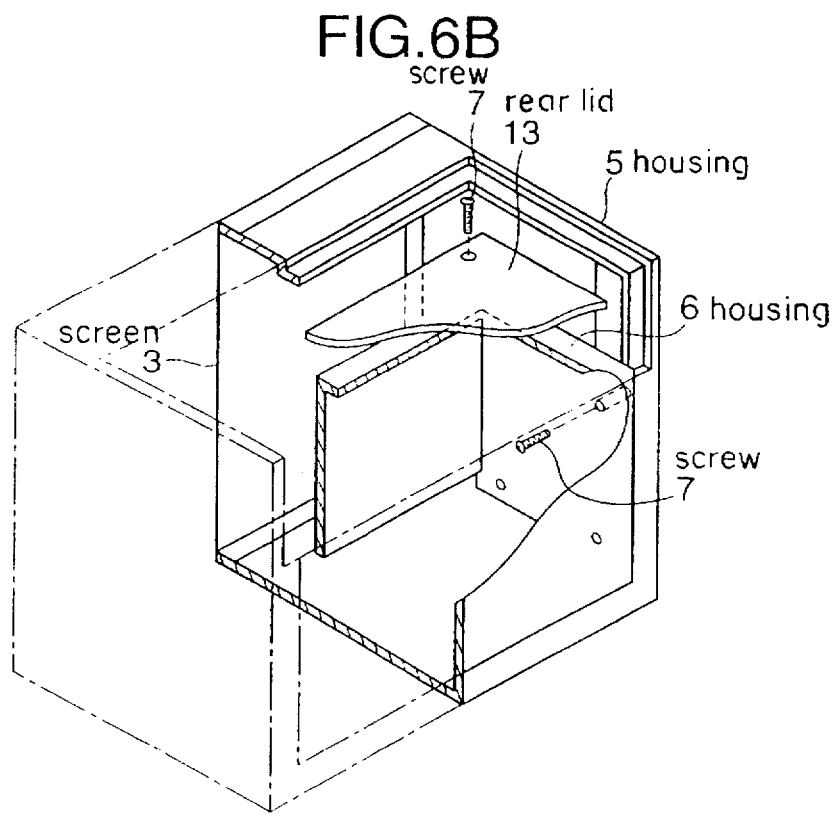

FIGS. 6A and 6B are fragmentary perspective views, with a cutaway view in part, of a projection television according to a fourth embodiment of the invention. The structural elements 3–7 are similar to those shown in FIG. 1A or FIG. 5 and description thereof has been omitted. The housing 6 is pivotally coupled to the housing 5 so that the housing 6 may be rotated into and out of the housing 5.

When expanding the projection television for viewing, a top plate, not shown, similar to the top plate in FIG. 5 is removed from the housing 5. Then, the housing 6 is rotated out of the housing 5 as shown in FIG. 6A. The housing 6 is firmly assembled to the housing 5 by means of screws 7 inserted from inside of the housing 6. Because these screws 7 are inserted from inside of the housing 6, they are not seen from outside, so that the appearance of the projection television is improved. The top plate is then replaced on the housing 5. A rear lid 13 is bolted to the housing 6 to cover a rear opening 6a of the housing 6 to protect the interior components from the environment.

When collapsing the projection television for transporting, the top plate 8 and rear lid 13 are dismounted from the housings 5 and 6, respectively. Then, the screws 7 are unscrewed so as to rotate the housing 6 into the housing 5. Then, the rear lid 13 is replaced on the housing 6, and finally the top plate on the housing 5. The construction of the fourth embodiment makes the appearance of the projection television more attractive.

Fifth Embodiment

Figure 7A:
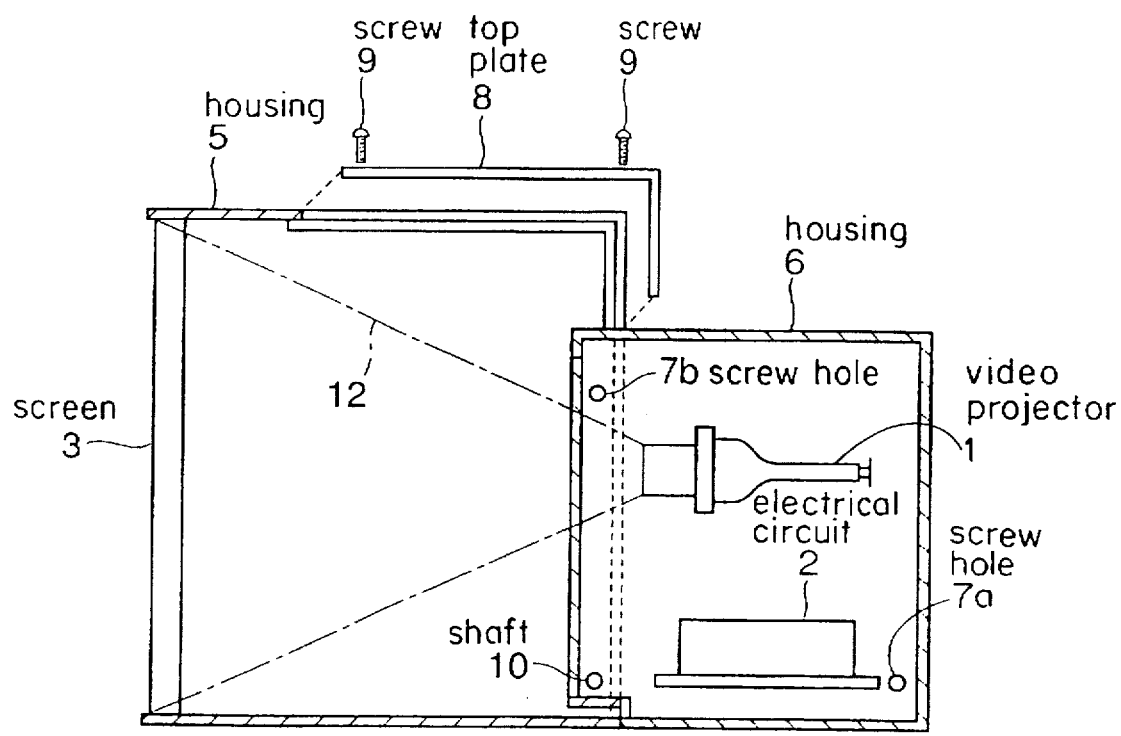
FIG. 7A is a cross-sectional side view of a projection television according to a fifth embodiment, which is a modification of the third embodiment.
Figure 7B:
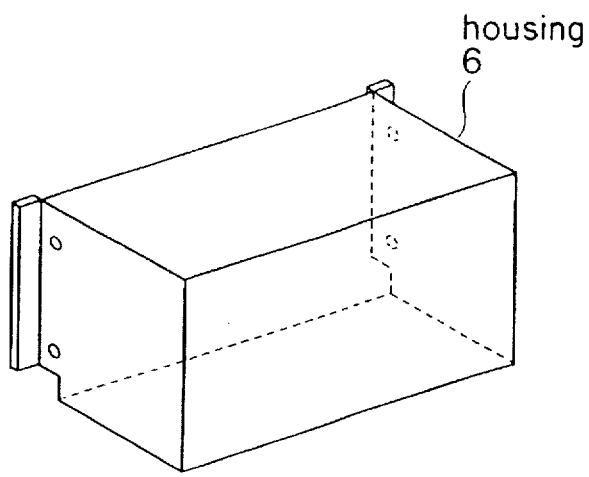
FIG. 7B is a rear perspective view of a housing 6 shown in FIG. 7A.

FIG. 7A is a cross-sectional side view of a projection television according to a fifth embodiment, which is a modification of the third embodiment. FIG. 7B is a rear perspective view of a housing 6. The structural elements 1–10 in FIG. 7A are similar to those shown in FIG. 5 and description thereof has been omitted. The housing 6 is adapted to pivot into and out of the housing 5 just as in the third embodiment. As shown in FIG. 7A, the projection television is so constructed that the bottoms of the housings 5 and 6 are substantially in the same plane when the television is expanded for viewing. The housing 6 is firmly bolted to the housing 5 with spacers, not shown, inserted between the housings 5 and 6. This construction allows the housings 5 and 6 to be placed in a stable manner during alignment, and eliminates a need for a special tool or a jig when the projection television is to be placed on a support. The construction where the bottoms of the housings 5 and 6 are substantially in the same plane may also be applied to the construction of the first embodiment.

Sixth Embodiment

Figure 8A:
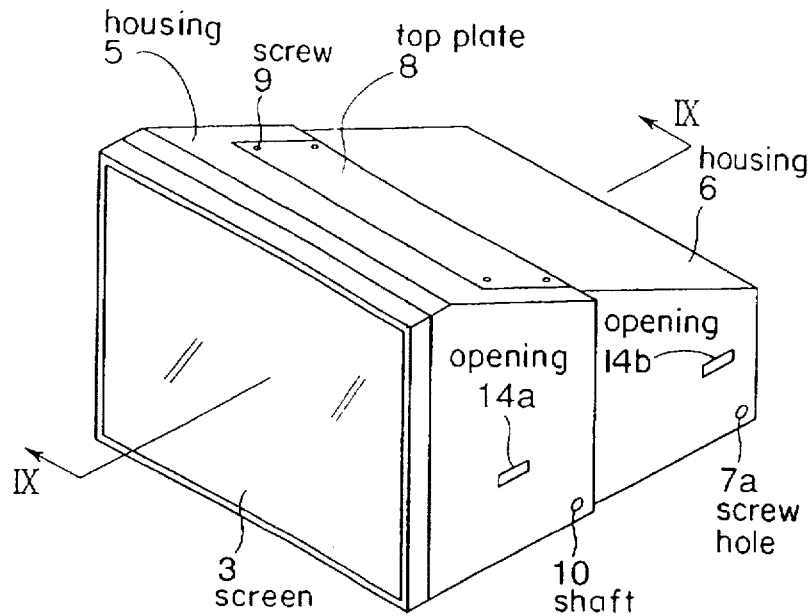
FIG. 8A is a front perspective view of a projection television according to a sixth embodiment of the invention.
Figure 8B:
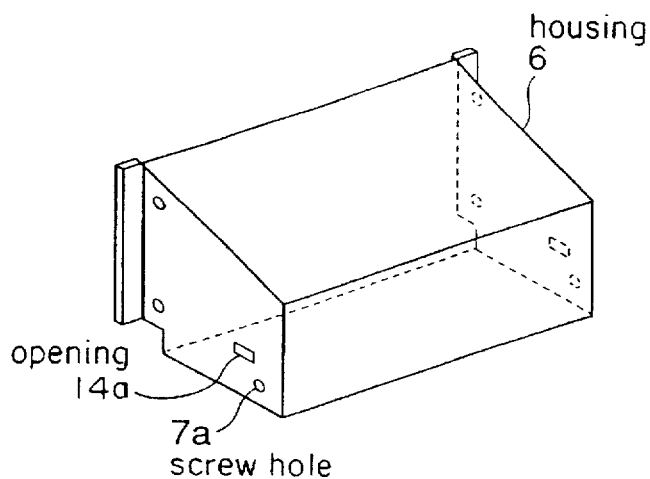
FIG. 8B is a rear perspective view of a housing 6 shown in FIG. 8A.
Figure 8C:
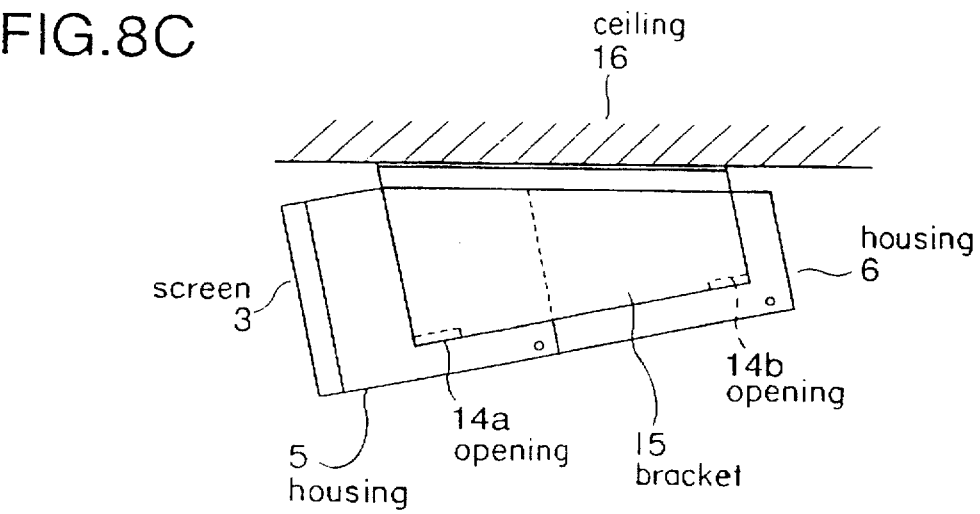
FIG. 8C shows the housings engaged with a bracket when mounting the projection television to the ceiling.
Figure 11:
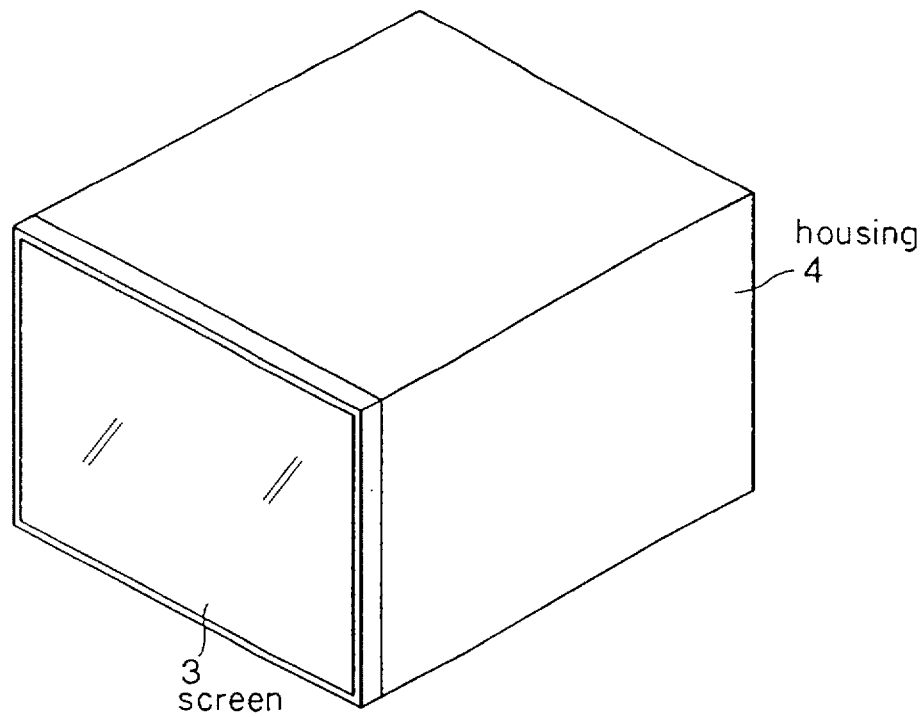
FIG. 11 is a perspective view of a prior art projection television.
Figure 12:
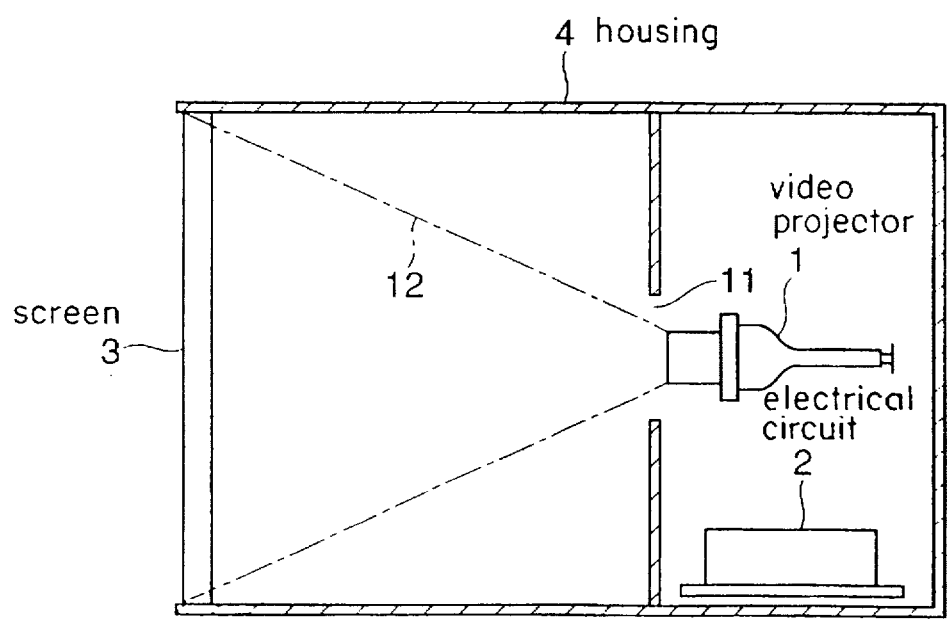
FIG. 12 is a cross-sectional side view of the prior art projection television shown in FIG. 11.

FIG. 8A is a front perspective view of a projection television according to a sixth embodiment of the invention and FIG. 8B is a rear perspective view of a housing 6. The sixth embodiment is a modification of the fifth embodiment. The structural elements 1–10 are similar to those shown in FIG. 7A and description thereof has been omitted. FIG. 9 is a cross-sectional side view taken along lines IX–IX in FIG. 8A of a projection television according to the sixth embodiment. The housing 6 is firmly bolted to the housing 5 with spacers, not shown, inserted between the housings 5 and 6. As shown in FIGS. 8A and 9, the housings 5 and 6 have inclined top surfaces substantially in the same plane when assembled for viewing. The housings 5 and 6 are formed with openings 14a and 14b, respectively, in its side walls which are engaged with hooks (not specifically illustrated) of a bracket 15 when mounting the projection television to the ceiling 16 as shown in FIG. 8C. The inclination of the top surface is advantageous in that the screen 3 is tilted for a comfortable viewing angle when the projection television is suspended from the ceiling 16. Mounting the projection television in such a way that the top surface is substantially parallel with the ceiling 16 automatically causes the screen to face obliquely downward, facilitating installation of the projection television in a limited space. The aforementioned construction also simplifies the construction of a bracket 15 mounted on the ceiling 16 which holds the projection television on the ceiling. Such a simple construction reduces the cost of the projection television.

Seventh Embodiment

FIG. 10 is a cross-sectional side view of a projection television according to a seventh embodiment of the invention, which is a modification of the sixth embodiment. The housing 6 is firmly bolted to the housing 5 with spacers, not shown, inserted between the housings 5 and 6. The structural elements 1–10 are similar to those shown in FIG. 9 and description thereof has been omitted. A single subchassis 11 holds a video projecting device 1 and an electrical circuit 2 in position and may be pulled out of the housing 6. The single subchassis 11 provides easy access to any part thereof and therefore lends itself to efficient wiring and assembly operations of all the circuits and components, and electrical alignment of the television. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection television having a video projector for projecting a video image, electrical circuit for supplying a video signal to the video projector, and screen on which the video image projected from the video projector is formed, comprising:

a first housing in which at least the screen is arranged; and a second housing in which at least the video projector is arranged; wherein said projection television is adapted to be disassembled, when transporting, either into said first housing and said second housing, or collapsed into one overall assembly where a smaller volume of said first and second housings is completely accommodated within a larger volume of said first and second housings, the smaller volume being introduced into the larger volume from a back side of the larger volume, and said projection television is adapted to be assembled, such that when viewing, the smaller volume of said first and second housings is substantially out of the larger volume of said first and second housings and the video projector projects the video image onto the screen from behind.

2. The projection television of claim 1, wherein said first housing is adapted to completely accommodate said second housing therein when transporting.

3. The projection television of claim 2, wherein said second housing is pivotally coupled to said first housing, and said second housing pivoting to a first position to project the video image onto the screen when expanded for viewing and to a second position to be completely accommodated in said first housing when collapsed for transporting.

4. The projection television of claim 1, wherein said first and second housings have top surfaces which are at an acute angle with the screen when assembled for viewing.

5. The projection television of claim 4, wherein said top surfaces of said first and second housings lie substantially in the same plane.

6. The projection television of claim 1, wherein said first and second housings have bottom surfaces lying substantially in the same plane when assembled for viewing.

7. The projection television of claim 1, wherein said housing of a smaller volume is partially received in said housing of a larger volume, and is fixedly mounted to said housing of a larger volume by fastening means from an inside of said housing of a smaller volume so that said fastening means is invisible from outside of the projection television.

8. The projection television of claim 1, wherein said first housing is formed with an opening in a top surface and a top plate is detachably mounted to said first housing to close the opening.

9. The projection television of to claim 1, further including a subchassis on which said video projector and said electrical circuit are mounted, said subchassis being accommodated in said second housing and being removable from said second housing.

10. The projection television of claim 3, wherein said first housing is formed with an opening therein and has a top plate detachably mounted to close the opening, and said second housing is pivotally coupled, at an axis, to said first housing and has a part furthest from the axis, the part being introduced through the opening into said first housing when said second housing pivots into said first housing with the top plate removed from said first housing.

11. The projection television of claim 8, wherein said second housing is pivotally coupled, at an axis, to said first housing and has a smaller volume than said first housing, said second housing having a part furthest from the axis, the part being introduced through the opening into said first housing when said second housing pivots about the axis into said first housing with the top plate removed from said first housing.

* * * * *